Patented May 25, 1954

2,679,509

UNITED STATES PATENT OFFICE 2,679,509

PINONIC AND PINOYLFORMIC ACID ESTERS

Torsten Hasselstrom, Philadelphia, Pa.

No Drawing. Application September 15, 1950,
Serial No. 185,139

17 Claims. (Cl. 260—468)

(Granted under Title 35, U. S. Code (1952),
sec. 266)

The invention described herein may be manufactured and used by or for the Government for governmental purposes, without the payment to me of any royalty thereon.

This invention relates to esters of keto terpenic acids, to methods of their preparation and to their application in the plasticizing of polymers and other uses.

It is well known in the art that camphor is a plasticizer of nitrocellulose. Numerous other terpenes have also been used for this and similar purposes; however, camphor and such other terpenes are relatively expensive and are frequently found to be incompatible with a particular resin.

I have found that certain esters of terpene carboxylic acids are excellent plasticizers and possess other valuable properties such as being fungistatic.

I have further found that certain esters suitable for the purposes of present invention may be synthesized, at a price far below the price of natural or synthetic camphor, by utilizing the crude sulfate turpentine which results as a by-product from the well-known sulfate pulp process.

It is thus an object of my invention to provide new esters of terpene carboxylic acids.

Another object of my invention is the production of such esters and of the intermediate products, i. e. of terpene carboxylic acids, from an inexpensive industrial by-product.

A further object of my invention is the provision of plasticized cellulosic and resinous films capable of withstanding extremely low temperatures.

Still another object of my invention is the provision of fungistatic and low temperature resistant coating materials, such as greases, lacquers, paints, wherein terpene carboxylic acid esters are incorporated.

Still another object of my invention is the provision of plasticized synthetic and natural resins, natural and synthetic rubber, such as molded resins, rubber compositions, cements and adhesives, wherein terpene carboxylic esters are incorporated.

Still further objects and advantages of my invention will become apparent from the following description of the same.

Among the esters contemplated by the present invention are the esters of such monocyclic keto terpene carboxylic acids as, for instance, pinonic acid, pinononic acid, pinoylformic acid, which three acids are characterized by a 2,2-dimethyl cyclobutane group to which a keto group is attached externally of the ring, or bicyclic keto terpene carboxylic acids such as camphenonic acid, keto camphoric acids, ketopinic acid, ketoteresantelic acid. However, other terpene carboxylic acids and their homologs and analogs may be employed as starting materials such as pinic acid, nopinic acid, camphoric acid, camphenic acid, and acids obtained by the oxidation of such bicyclic terpenes as fenchenes, bornylene, carene, sabinene, cedrene, caryophyllene, cadinene, or of their hydrogenated counterparts such as camphanes, fenchanes, apobornylane, santane, norcamphane, and acids obtained from naphthenes and their homologs and analogs and from homoterpenes. Suitable alcohols for esterifying these terpene carboxylic acids are liquid alcohols of the type $A(OH)_{1\ or\ 2}$, A being an organic residue, e. g. aliphatic alcohols, particularly those whose carbon chain has at least 5 carbon atoms, cycloaliphatic alcohols, and aromatic alcohols wherein the benzene ring and the hydroxyl group are linked by methylene; examples of suitable esterifying alcohols are amyl alcohol, hexanol, octanol, substituted glycols, cyclohexanol, benzyl alcohol, and natural or synthetic hydroxy-terpenes such as nopol. Esterification may take place by conventional methods, such as refluxing and removal of water by excess alcohol and/or and aromatic hydrocarbon such as toluene or xylene. Conventional esterification catalysts such as benzene sulfonic acid may also be employed, particularly when steric hindrance is encountered.

It will be understood that the esters may also be produced by reacting the acid anhydride or acyl halides or reactive salts of terpene carboxylic acids with an esterifying substance; ester exchange (i. e. esterification of a terpene carboxylic acid, followed by exchange of the alcohol residue group for another) is also within the purview of my invention.

The following examples illustrate the production of some of the pinonic acid esters contemplated by the present invention:

EXAMPLE I

Benzyl ester of pinonic acid 150 g. alpha-pinene was emulsified by mixing in 3000 cc. of water, and 232 g. of potassium permanganate added with efficient stirring, in portions, during a period of about four hours. The temperature was kept below 20° C. and the stirring continued for four hours additional. After standing overnight, the color of the permanganate had disappeared. The manganese dioxide formed in the reaction was removed by filtration, the precipitate washed with about 300 cc. of water, and the clear filtrate evaporated in a stream of carbon dioxide until approximately 500 cc. of a brown syrup remained. This residue was acidified with dilute sulfuric acid, whereby the terpene carboxylic acids separated as an upper, oily layer, which was separated by gravity from the lower aqueous layer containing potassium sulfate and free sulfuric acid. Yields of terpene carboxylic acids, crude pinonic acid, were approximately 50% by weight of the starting material, alpha-pinene.

In order to recover maximum amounts of terpene carboxylic acids, the aqueous lower layer was extracted with ethyl ether, the ether solution dried with anhydrous sodium sulfate, and the ether distilled off, whereby the residue represents the total amount of terpene carboxylic acids produced. Instead of ethyl-ether any water-immiscible solvent may be used, in which the terpene carboxylic acids are soluble as, for instance, chloroform, tetrachloroethane, ethylenedichloride, aliphatic hydrocarbons, benzene and its homologs, aliphatic and aromatic ethers and esters. In the acidification step, hydrochloric acid, phosphoric acid, acid sodium sulfate and the like might be used instead of sulfuric acid.

75 g. crude pinonic acid prepared as above was refluxed with an excess of benzyl alcohol and approximately 25 cc. of toluene at about 190° C., water being continuously removed in a water trap. After several days of reflux when the acid number of the mixture was approximately one, the mixture was steam distilled to remove excess benzyl alcohol and toluene, extracted with ether, and after evaporating off the ether, fractionated under reduced pressure. The fraction boiling at 160–190° C. (200–250μ) was collected. The yield was 55.2 g. of refined benzyl ester of pinonic acid; refractive index $n_D^{20}=1.5137$; $n_D^{25}=1.5119$; specific gravity $d_4^{20}=1.06221$; melting point of the semicarbazone 116–117° C. The semicarbazone in this and the following examples was prepared by dissolving the ester, semicarbazide hydrochloride and fused sodium acetate separately in ethanol and water, combining the solutions, placing the combined solution in an ice box for a few days, precipitating the solid semicarbazone from the solution by the addition of cold water, and recrystallizing from dilute ethanol.

While potassium permanganate was employed as the oxidation reagent for turpentine in this example, other oxidizing agents which do not split the 2,2-dimethyl cyclobutane ring of alpha-pinene (which is the principal constituent of turpentine) may be employed for the making of terpenecarboxylic acids from turpentine as, for example, sodium permanganate, alkali and alkaline earth dichromates, alkaliferrocyanides, sulfomonoperacid, and the like. Furthermore, ozonation, autooxidation, oxidation with air or oxygen under pressure, in the presence of alkali and catalysts as, for example, manganese salts, electrolysis, etc., may be employed; but for securing high yields of terpenecarboxylic acids, intermediate compounds such as alcohols, glycols and aldehydes may have to be subjected to a reoxidation.

EXAMPLE II

Ethoxy ethyl ester of pinonic acid 75 g. of crude pinonic acid (from Example I) and an excess of ethyleneglycolmonoethylether and 0.01% of benzene sulfonic acid as a catalyst were refluxed as described in Example I. After about eighty hours of heating, the acid number was 23. The brownish oil was dissolved in ether, washed with aqueous sodium bicarbonate and water. The residue was fractionated in vacuum after removing the ether. About 41 g. were collected of the fraction boiling at 120.5–121.5° C. (100–150μ) refractive index, $n_D^{20}=1.4579$, $$n_D^{25}=1.4564$$

specific gravity, $d_4^{20}=1.01969$, melting point of the semicarbazone 70–72° C.

EXAMPLE III n-Hexyl ester of solid pinonic acid 1103 g. crude pinonic acid, prepared in the same manner as described in Example I was subjected to fractional distillation under reduced pressure at about 11–14 mm.:

| Fraction | Boiling Point, ° C. | Yield, g. | Remarks |
|---|---|---|---|
| 1 | 30–159 | 53.8 | A brownish slightly viscous oil. |
| 2 | 159–175 | 94.7 | Partly crystalline light viscous oil. |
| 3 | 176–179 | 404.5 | Crystalline light yellow oil. |
| 4 | 184–187 | 327.1 | Do. |
| 5 | 192–199 | 27.6 | Partly crystalline. |
|   |         | 140.6 | Residue. |
|   |         | ¹ 54.7 | Distillation loss. |
|   |         | 1,103 |   |

¹ 4.96%.

Fractions 3 and 4 were combined and separated by filtration into 247 g. solid pinonic acid and 452.8 g. liquid pinonic acid, which upon refractionation at reduced pressure, yielded additional 58 g. of solids.

The solid pinonic acid was recrystallized from ethanol and then from water; melting point 102–104° C. (absorption max. at 283 mμ; $(\alpha)_D^{22.5}$ —1.09 (in ethanol); inactive in chloroform solvent. The semicarbazone of dl-pinonic acid melted at 207° C. The characteristics of this acid agree with those given in the literature for dl-pinonic acid. 50 g. solid dl-pinonic acid was refluxed for approximately 16 hours with 54 g. n-hexyl-alcohol (boiling point 154.2–155.2° C.) until about the theoretical amount of water had collected in the water trap. The resultant 46.2 gms. of the hexyl ester of dl-pinonic acid showed the following characteristics: boiling point 140–141.5° C. (55–60μ); optically inactive; refractive index, $n_D^{25}=1.4542$; $n_D^{20}=1.4561$; specific gravity $d_4^{20}=0.90533$; molecular refraction, found: 74.42, calculated 75.43. Analysis. — Calculated for $C_{16}H_{28}O_3$: C, 71.64%; H, 10.45%. Found: C, 70.93%, 70.93%; H, 10.21%, 10.00%. Semicarbazone: melting point 97° C.

EXAMPLE IV

Hexyl ester of liquid pinonic acid 70 g. liquid pinonic acid ($[\alpha]_D^{22.5}=+15.07$ in alcohol; $d_4^{20}=1.07667$; $n_D^{20}=1.4682$; semicarbazone M. P. 197–198° C.), prepared from fractions 3 and 4 of Example III was esterified with an excess of n-hexyl-alcohol in the same manner as described for dl-pinonic acid. The yield of the n-hexylester of liquid pinonic acid was 47.5 g.: boiling point 113–114° C. (260μ); refractive index, $n_D^{25}=1.4534$; $n_D^{20}=1.4555$; specific gravity, $d_4^{20}=0.9623$; molecular refraction found: 75.75, calculated for $C_{16}H_{28}O_3$, 75.43; $(\alpha)_D^{22.5}=+12.93$ in ethanol. Analysis.—Calculated for the hexyl ester of pinonic acid $C_{16}H_{28}O_3$: C, 71.64%; H, 10.45%; for the hexyl ester of pinonic acid $C_{15}H_{26}O_3$: C, 70.87%; H, 10.24%. Found: C, 70.32%; 70.20%; H. 10.26, 9.94%. The semicarbazone of the n-hexylester melted at 100° C.

According to current scientific literature the liquid pinonic acid is a mixture of isomeric pinonic acids, and analogs and homologs of the same, as for example, pinononic acid and pinoylformic acid; this accounts for the slightly lesser carbon and hydrogen content of the ester, as found, by comparison with the calculated values.

EXAMPLE V

*Esterification of pinonic acid with 2-ethyl-hexanediol-1,3*

92 g. liquid pinonic acid 80 g. 2-ethyl-hexanediol-1,3 and 70 g. of xylene were placed in a 500 cc. round-bottom flask fitted with a reflux condenser and a Dean-Stark water trap containing 10 cc. of xylene; the liquid pinonic acid (a mixture of pinonic, pinononic and pinoylformic acids) was obtained in accordance with the procedure set forth in Example III. The mixture was refluxed at 155–161° C. for approximately 80 hours. The dark brown solution was shaken with a concentrated aqueous solution of sodium carbonate, dried with anhydrous sodium sulfate, filtered and fractioned in vacuum. A mixture of branched ethyl hexane diol esters of liquid pinonic acid was obtained, since the result shows no constant boiling portion.

| Fract. | B. P., ° C. | Yield, Grams | $d_4^{20}$ Density | Remarks |
|---|---|---|---|---|
| 1 | 52°/32 mm | 88.3 | | Discarded. |
| 2 | 98–126°/195μ | 23.5 | 0.95504 | |
| 3 | 125–140°/125–195μ | 18.6 | 1.03396 | Plasticizer. |
| 4 | 142–155°/125μ | 14.7 | 1.03266 | |
| 5 | 155–167°/125μ | 30.3 | 1.01637 | |
| 6 | 167–180°/125μ | 25.8 | 1.01222 | |
| 7 | 180–225°/125μ | 24.7 | 1.01855 | |
| 8 | | 7.0 | | Residue. |
| | | 232.9 | | |

Fraction 3 was employed as a plasticizer for cellulose acetate films. This choice was made because this fraction has the highest density of all fractions obtained and thus appears to be the most uniform in composition of the fractions obtained. The semicarbazone of fraction 3 has a melting point of 187–189° C.; it is in the form of white needles.

The following examples illustrate the production of keto terpene carboxylic acid esters and of the intermediate terpene ketocarboxylic acids from crude sulfate turpentine. The crude sulfate turpentine, which is used as a starting material, is obtained by the condensation of the released gases of the pulp digester used in the sulfate pulp process, a process well known to the art, and described, e. g. in Rogers' Industrial Chemistry, vol. 2, 1942, page 1418. The sulfate pulp process essentially comprises the cooking of wood chips in a closed digester in the presence of a cooking liquor composed of sodium hydroxide, sodium sulfide, and sodium sulfate; coniferous turpentine-rich woods, such as southern pine, are particularly adapted for this process. In a typical cooking operation, the chips are heated with steam for 2–3 hours at approximately 110 pounds' pressure, and the resulting pulp is then drawn off, washed and screened. It will be readily understood however, particularly by experts in the wood pulp field, that the cooking time, temperature and pressure employed in the digestion step of the sulfate process lend themselves to a substantial margin of variability, depending on the judgment of the plant engineer. The gases which evolve as by-products of the digestion (cooking) step are collected and condensed; these gases and condensation products should of course not be confused with the spent sulfate liquor with which the present invention is not concerned. In the case of turpentine-rich pine wood, which is customarily used in the sulfate process, particularly southern pine, e. g. Georgia pine, the condensation product from the gases evolved during the digestion of the wood chips is principally a mixture of alpha and beta pinene (approximately 68% alpha pinene and 29% beta pinene) together with quantities (about 3%) of methyl and other mercaptans and other evil-smelling sulfur compounds; this condensation product will be hereafter referred to as "crude sulfate turpentine." Its composition is similar to the composition of the gum spirits of turpentine obtained from southern pine (approximately 70% alpha pinene and 30% beta pinene). On the other hand, the distilled wood turpentine obtained from southern pine contains almost 100% alpha pinene; the terms "alpha pinene" and "turpentine" per se (i. e. distilled turpentine as distinguished from "crude sulfate turpentine") will be used interchangeably hereafter.

Besides the crude sulfate turpentine obtained from southern pine, crude sulfate turpentine obtained from certain other domestic and foreign species of coniferous woods naturally rich in alpha pinene may also be used for the purposes of the present invention.

The sulfite pulp process (wherein the wood chips are digested in the presence of calcium bisulfite and free sulfurous acid; see Rogers' Industrial Chemistry, vol. 2, page 1417) also yields a gaseous by-product in the course of the digestion step, which can be condensed to a liquid containing crude turpentine adulterated with sulfur compounds. Inasmuch as the types of wood customarily used in the sulfite pulp process are relatively poor in alpha pinene content, the turpentine obtained as a by-product of the sulfite process is ordinarily undesirable for the practice of the present invention. However, it will be understood that if southern pine and other woods whose natural alpha pinene content approximates that of southern pine are used in the sulfite pulp process, the crude turpentine resulting from the condensation of the gases evolved during the digestion of the chips will be suitable for the practice of the present invention by reason of its high alpha pinene content, and such crude turpentine is therefore deemed to be included in the term "crude sulfate turpentine" as employed herein.

EXAMPLE VI

*Pinonic acid from crude sulfate turpentine, and cyclohexyl ester therefrom*

750 g. crude sulfate turpentine was emulsified by mixing in 15,000 cc. of water, and 1160 g. of potassium permanganate was added with efficient stirring, in portions, during a period of about four hours. The temperature was kept below 20° C. and the stirring continued for four hours additional. After standing overnight, the color of the permanganate had disappeared. The manganese dioxide which formed in the reaction was removed by filtration, the precipitate washed with water, and the filtrate evaporated in a stream of carbon dioxide until a brown syrup remained. This residue was acidified with dilute sulfuric acid, whereby the crude terpene carboxylic acids separated as an upper, oily layer, which was separated by gravity from the lower aqueous layer containing potassium sulfate and free sulfuric acid. The yield was 337.5 g. (about 45% by weight of the sulfate turpentine starting material) of crude terpene carboxylic acids, mainly crude dl-pinonic acid. The product was dark brown in color and crystallized partly on standing at room temperature.

319 g. of this material was fractionated in vacuum with the following results:

| Fraction | Boiling Point, °C. | Yield, Grams | Remarks |
|---|---|---|---|
| 1 | 103–160/9.5 mm | 33 | S test positive. |
| 2 | 170–181/10 mm | 274 | Semicryst. prod. S test negative. |
| 3 | | 8.7 | Residue. |
| | | 3.3 | Dist'n. loss. |
| | | 319.0 | |

The presence or absence of sulfur was ascertained by the sodium fusion procedure using lead acetate as specific reagent for the precipitation of sulfur as black lead sulfide.

197. g. of fraction 2 were separated by filtration into 27.5 per cent of crude solid dl-pinonic acid and 72.4 per cent liquid pinonic acids. The dl-pinonic acid was purified through recrystallization from ethanol and then from water. Colorless, transparent plates, melting point, 99.5–101.5° C. neutr. equiv.: calcd. for a monobasic acid $C_{10}H_{16}O_3$, 184.2. Found: 184.

The liquid portion was optically active $[\alpha]_D^{26.8}$ +23.5°; $d_4^{20}$ 1.07289; $n_D^{20}$ 1.4742; neutr. equiv.: 252.6.

A 75 g. portion of the unfractionated crude terpene carboxylic acids (a pinonic acid mixture) was esterfied with an excess of cyclohexanol by refluxing for approximately 16 hours until about the theoretical amount of water had collected in the water trap. The crude ester was fractionated under reduced pressure:

| Fraction | B. P., °C. | Pressure | Yield, g. | Density | Refractive Index | Remarks |
|---|---|---|---|---|---|---|
| 1 | 71–151 | 13–22 mm | 34.3 | | | Odorless. Sulfur test positive. Cyclohexylester. |
| 2 | 145 | 190μ | 64.6 | $d_4^{20}$=1.02462 | $n_D^{20}$=1.4791<br>$n_D^{25}$=1.4771 | Odorless. Sulfur test negative. |
| 3 | | | 8.2 | | | Residue. |

The cyclohexylester of crude pinonic acid from crude sulfate turpentine (fraction 2) was also characterized through its semicarbazone: melting point 126–127° C.

It will be understood that, besides potassium permanganate, other oxidation reagents and processes enumerated in Example I, above, may be employed in the oxidation of crude sulfate turpentine to keto terpene acids.

EXAMPLE VII

*Hexyl ester of pinonic acid from crude sulfate turpentine*

The n-hexyl ester of crude terpene carboxylic acids (mainly dl-pinonic acid) was produced as follows:

319 g. crude terpene carboxylic acids from crude sulfate turpentine (Example VI) was frationated under reduced pressure with the following results:

| Fraction | Boiling Pt., °C. | Pressure, mm. | Yield | Remarks |
|---|---|---|---|---|
| 1 | 103–160 | 9.5 | 33 g. | Sulfur test positive. Semicrystalline mass. |
| 2 | 170–181 | 10 | 274 g. | Sulfur test negative. |
| 3 | | | 87 g.<br>3.3 (1.05%) Loss | Residue. |
| | | | 319 g. | |

Fraction 1, a sulfur-contaminated forerun, was discarded.

197.49 g. of the main fraction were separated by filtration into 27.5% solid acids and 72.4% liquid acids.

The liquid acid portion showed the following characteristics: Refractive index $n_D^{20}$=1.4742$^{20}$; density $d_4^{20}$=1.07289; neutr. equiv., 252.6.

A 50 g. portion of the last-mentioned liquid pinonic acid portion was refluxed with n-hexanol until the theoretical amount of water had collected in the water trap. The resulting n-hexyl ester of liquid pinonic acid was obtained in a yield of 43.9 g., and had the following constants: B. P. 138–145° at 350–375μ; refractive index $n_D^{25}$=1.4572; $n_D^{20}$=1.4589; density $d_4^{20}$=0.97107.

EXAMPLE VIII

*Benzyl ester of pinonic acid from crude sulfate turpentine*

35 g. crude terpene carboxylic acids from Example VI were esterfied with benzylalcohol following the same procedure as described in previous examples. The components were refluxed for about 50 hours at about 200–240° C. The resultant product was then directly fractionated at reduced pressure:

| Fraction | B. Pt., ° C. | Pressure | Yield, g. | Density | Refrac. Index | Remarks |
|---|---|---|---|---|---|---|
| 1 | 68–110 | 20–28 mm | 86.4 | | | |
| 2 | 170 | 20 mm | 9.1 | | | |
| 3 | 71–150 | 180μ | 15.5 | | | |
| 4 | 150–152.5 | 180μ | 26.5 | $D_4^{20}=1.06965$ | $n_D^{20}=1.5146$; $n_D^{25}=1.5131$ | Benzylester, a pale yellow liquid. |
| 5 | | | | | | Residue. |

The benzylester of the crude pinonic acid (fraction 4) was also characterized through its semicarbazone: melting point 107–108° C.

The following example illustrates the production of esters of crude keto terpene carboxylic acids and terpene alcohols, both produced from alpha pinene (turpentine). The essence of this process is (1) the oxidation of alpha pinene (turpentine) to form terpene alcohols, (2) the further oxidation of a portion of the terpene alcohols to form terpene carboxylic acids, and (3) the formation of esters by reacting the terpene alcohols with the terpene carboxylic acids. Continuous extraction with chloroform is utilized in the production of the acids.

EXAMPLE IX

*Pinonic acid produced by continuous extraction, and its terpenyl ester*

136 g. alpha-pinene was emulsified by stirring with 3200 g. water containing 66 g. of ammonium sulfate. To the mixture was added 316 g. potassium permanganate at a temperature below 20° C. during a period of 14 hours. After an additional 32 hours, all the permanganate had reacted, and the manganese dioxide formed in the reaction was filtered off. The clear aqueous filtrate was light brown in color. Four batches were combined and extracted with chloroform. The yield was 40.4 g. of a brownish-colored viscous oil, which had the following properties: density $d_4^{20}$ 1.08147; refraction index $n_D^{20}$ 1.48712.

This product is a non-acidic mixture of cyclo-aliphatic terpene alcohols and glycols.

One half of this viscous oil was made acid with dilute sulfuric acid to about pH 5.5 and subjected to continuous countercurrent extraction with chloroform as follows: The aqueous solution was introduced at the bottom by gravity feed of an extraction column and chloroform was introduced at the top. The extracted aqueous terpenic acid layer was continuously drawn off at the top and collected in a receiving vessel. The chloroform, which formed a layer at the bottom portion of the extraction column, was continuously drawn off at the bottom and fed to a refluxing still in which it was continuously distilled and returned to the column at the top. The oxidation products, a brownish semi-solid mass, neutr. equiv. 216.3, were identified as containing principally crude pinonic acid; they contained more solids (dl-pinonic acid) than the oxidation product obtained from alpha pinene with an alkaline permanganate solution according to Example I.

Equal portions by weight of the crude pinonic acid, produced as just described, and of the terpene alcohol mixture, produced as described in the first paragraph of this example, were esterified, using xylene as the water carrying-off reagent. After 40 hours of reflux, approximately 50% of amount of water calculated had been given off. An additional 40 hours of heating and in the presence of 0.01% of benzenesulfonic acid, a total amount of 150% of water calculated was collected. The resultant dark brown oil was dissolved in ether and the ether solution extracted with dilute sodium bicarbonate solution for removing the excess pinonic acid. After washing with water and drying the ether solution with anhydrous sodium sulfate, the ether was removed by distillation and the residue fractionated at reduced pressure. The main fraction, terpenyl ester of crude pinonic acids, was a reddish colored oil; boiling point 118–184° C. (260μ); refractive index, $n_D^{21}=1.4930$; $n_D^{25}=1.4918$; density, $d_4^{20}=1.04315$. A principal use of the terpenyl ester of crude pinonic acid is as a plasticizer, e. g. for cellulose acetate and cellulose propionate.

The following examples illustrate the production of various new esters of terpene carboxylic acids other than pinonic acid.

EXAMPLE X

*Texyl diester of camphenic acid*

70 g. of camphenic acid were esterified with an excess of n-hexyl alcohol by refluxing until approximately the theoretical amount of water had collected in the water trap. The product was fractionated at reduced pressure.

| Fraction | B. Pt., ° C. | Pressure, μ | Yield, g | Refrac. Index | Density | Remarks |
|---|---|---|---|---|---|---|
| 1 | 153–157.5 | 160 | 10 | | | |
| 2 | 156.5–157.5 | 165 | 70.5 | $N_D^{25}=0.9573$; $N_D^{20}=1.4599$ | $d_4^{20}=0.9573$ | n-hexyl diester of camphenic acid. |
| 3 | | | | | | Residue. |

Fraction 2 was analyzed. Calculated for $C_{22}H_{40}O_4$: C, 71.74%; H, 10.87%. Found: C, 72.70%, 72.24%; H, 11.16%, 11.00%. Molecular refraction, calculated: 104.47; found: 104.51. The resulting product is thus identified as the n-hexyl diester of camphenic acid, structural formula:

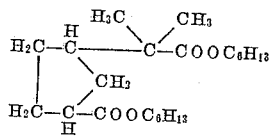

EXAMPLE XI

*Hexyl ester of camphenonic acid*

10 g. of camphenonic acid were esterified with an excess of n-hexyl alcohol, as described in preceding example. 9.5 g. of the n-hexyl ester of camphenonic acid were obtained. The ester had the following characteristics: boiling point 151–151.5° C./250μ; refractive index $n_D^{20}=1.4649$; density, $d_4^{20}=1.00-1.54$. Analysis.—calculated for $C_{16}H_{20}O_3$: C, 72.18%; H, 9.77%. Found: C, 71.43%, 71.70%; H, 9.43, 9.34. Molecular refraction.—Calculated: 73.40. Found: 73.40. Structural formula of the n-hexyl ester of camphenonic acid:

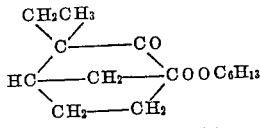

EXAMPLE XII

Esterification of nopinic acid with n-hexyl alcohol 25 g. of nopinic acid (M. P. 129° C.) and 100 cc. of n-hexyl alcohol and 0.02% benbenesulfonic acid was refluxed while collecting water which was split off in the course of the reaction. After heating for 21 hours, 2.23 mols of water were formed. The reaction mixture was fractionated in vacuum with the following results:

| Fraction | Boiling Point, °C. | Pressure | Yield, g. | Refractive Index | Density | Remarks |
|---|---|---|---|---|---|---|
| 1 | 70–180 | 20–25 mm | 51 | | | |
| 2 | 129–133 | 175μ | 4.7 | | | |
| 3 | 133–145 | 175μ | 15.7 | $n_D^{20}=1.4780$ | $d_4^{20}=0.96028$ | |
| 4 | | | 7.3 | | | Residue. |

Molecular refraction of fraction 3 was 73.67. Inasmuch as over twice as much water was split off during the reaction than was calculated for the formation of the n-hexyl ester of nopinic acid by direct esterification, it is postulated that an internal dehydration also took place in the bicyclic terpene ring and that the monocyclic n-hexyldihydrocumate was formed. The calculated molecular refraction of n-hexyl dihydrocumate (74.63) agrees with the value actually found (73.67) for fraction 3.

EXAMPLE XIII

Hexyl diester of camphoric acid (direct esterification)

225 g. of d-camphoric acid (M. P. 187° C.) ($[\alpha]_D^{22.5}=+47.1$ in ethanol), 248 g. of n-hexyl alcohol and 0.1% of benzenesulfonic acid were refluxed for 64 hours at a temperature of about 135–145° C. After an additional 50 g. of n-hexyl alcohol were added, the mixture was heated for 15 hours. Altogether approximately two moles of water were removed during the reaction. The crude n-hexyl diester of d-camphoric acid was fractionated under reduced pressure at 2.4 mm. The first fractions were discarded and the remaining fraction of about 190 g. having a boiling point of about 183° C. was refractionated at high vacuum with the following results:

Structural formula of the n-hexyl diester of d-camphoric acid:

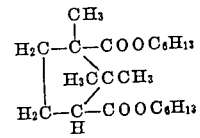

The n-hexyl diester of d-camphoric acid may also be produced from the silver salt of d-camphoric acid and hexyl iodide as follows:

EXAMPLE XIV

Hexyl diester of camphoric acid (alternate method)

100 g. of d-camphoric acid were suspended in a minimum of water and made slightly alkaline by adding a 10% aqueous solution of sodium hydroxide. An aqueous solution containing about 10% more than the calculated amount of silver nitrate, 190 g. was added, the precipitated disilver salt of camphoric acid was filtered off and washed with water. The brownish silver salt was covered with about a 10% excess of n-hexyl iodide, after removing excess water by drying in vacuum. After the ensuing exothermic reaction, the mixture was then heated in a water bath at about 75° C. for 22 hours. After separating the silver iodide formed in the reaction by filtration, the precipitate was washed with alcohol, and the filtrate distilled with steam to remove unreacted n-hexyliodide. The residue from the steam distillation was dissolved in ether and the ether solution treated with aluminum amalgam overnight, in order to remove all traces of iodine. The aluminum oxide was filtered off, the ether solution washed with dilute sulfuric acid and then with water. After evaporation of the ether, 124.8 g. of the residue was fractionated in vacuum. The first fractions were discarded because of separation of camphoric anhydride, and the main fraction consisting of n-hexyl di-ester of d-camphoric acid was collected: boiling point, 170–171° C. at 125μ pressure; yield 54 g.; refractive index $n_D^{20}=0.96923$.

EXAMPLE XV

Hexyl monoester of camphoric acid 70 g. n-hexanol and 12.6 g. metallic sodium

| Fraction | B. Pt., °C. | Pressure, μ | Yield, g. | Refrac. Ind. | Density | Opt. Rot. |
|---|---|---|---|---|---|---|
| 1 | 152–165 | 68 | 32.2 | $n_D^{25}=1.4576$ | $d_4^{20}=0.96468$ | $(\alpha)_D^{19.5}=+18.85$ in ethanol. |
| 2 | 159–161.5 | 65–68 | 147.3 | $n_D^{20}=1.4597$ | | |
| 3 | | | 9 Residue | | | |

Fraction 1 contained camphoric anhydride. Fraction 2 was identified as the pure n-hexyl diester of d-camphoric acid. Molecular weight calculated for $C_{22}H_{40}O_4$: 104.47. Found, 104.46.

were gently heated. After the disappearance of the sodium, 100 g. d-camphoric anhydride were added and the mixture heated under reflux for 6 hours at 190° C. The product was then dissolved in 1000 cc. of water. The aqueous solution was extracted with ether to remove unreacted starting materials and then acidified with dilute sulfuric acid. The hexyl monoester of d-camphoric acid separated as an oily upper layer. This was taken up in ether, the ether solution washed with water and dried with anhydrous sodium sulfate. After distilling off the ether, the residue, 134.7 g., was fractionated in high vacuum. The main fraction, 120 g., B. P. 185–187° C., was a semi-solid mass.

Unreacted d-camphoric anhydride was removed from this mass by dissolving the latter in ether and extracting the ether solution with sodium carbonate. The ester was then regenerated from the sodium carbonate solution (yield 76.4 g.) and redistilled. The purified hexyl monoester of d-camphoric acid was obtained in a yield of 47 g.; boiling point 196–206° C./325μ; density $d_4^{20}$=1.0350; index of refraction $n_D^{20}$=1.4702; neutr. equiv., calculated for monobasic acid $C_{16}H_{28}O_4$ 284.4; found 269. Structural formula of the n-hexyl monoester of d-camphoric acid:

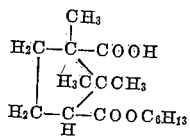

A highly valuable property of the esters of terpene carboxylic acids produced in accordance with the preceding examples, and of a number of their homologs and analogs is their low pour point (freezing point), which enables their use as plasticizers for cellulose acetate films and other polymers, and rubber, for use in arctic climates. The following table shows the pour points of a number of these esters, and compares them with the pour points of a number of conventional non-terpenic plasticizers.

|  | Pour (Freezing Point) | Remarks |
|---|---|---|
| Terpene Carboxylic Acid Esters: |  |  |
| Benzyl ester of pinonic acid | −52° C |  |
| Hexyl ester of dl-pinonic acid | Below −76° C | Plastic. |
| Hexyl ester of liquid pinonic acid | Below −79° C | Do. |
| Hexyl diester of camphoric acid | Below −75° C | Do. |
| Hexyl diester of camphenic acid | Below −79° C | Do. |
| Commercial Plasticizers: |  |  |
| Butylphthalate | −74° C | Crystalline. |
| Methylphthalate | −2° C | Do. |
| Santicizer E-15 (ethyl phthalyl ethyl glycollate) | Below −44° C | No longer plastic. |
| Santicizer M-17 (methyl phthalyl ethyl glycollate) | −36° C | Do. |

The tests for evaluating the performance of terpene carboxylic acid esters of the present invention as plasticizers for various cellulose and synthetic resin films fully bore out the expectations raised by their favorable pour point characteristics. The tests were carried out by preparing a stock solution of 70 g. of the cellulose ester or resin in 1000 g. of organic solvent, and adding the plasticizers in the ratio of 1 part of plasticizer to 4 parts of stock solution (except in the case of polystyrene to which the plasticizers were added in the ratio of 1:3). 25 g. portions of each plasticized solution were poured into Petri dishes of 9.5 cm. diameter, and the solvent was allowed to evaporate over a period of approximately 3 days.

Per cent shrinkage was computed after formation of the film by determining the ratio of the uncovered area of the Petri dish with its total area. Per cent shrinkage of less than 3% should be considered negligible in actual practice.

Flexibility at room temperature (20° C.) was determined by folding 1 sq. cm. of the film on an axis first in one direction and then in the opposite direction. The film is folded again on an axis which is perpendicular to the first axis in one direction and then again in the opposite direction. Any break in the film caused it to be considered non-flexible. To determine the flexibility below −50° C., 1 sq. cm. of the film was placed in a test tube, which was immersed in a Dry-Ice acetone bath. After a period of approximately five minutes, the film was tested for flexibility as previously described.

(a) The following results were obtained with Cellulose Acetate PM-3 (Hercules Powder Company):

Clear films with shrinkage of 0–2%, and flexible at 20° C. and below −50° C., by the addition of:

n-Hexyl diester of camphoric acid
n-Hexyl ester of pinonic acid (source: liquid pinonic acid from alpha pinene)
Cyclohexyl ester of pinonic acid obtained from crude sulfate turpentine (film not flexible at −50° C.)
Benzyl ester of pinonic acid obtained from crude sulfate turpentine
Ethoxyethyl ester of pinonic acid (b) The following results were obtained with Cellulose Triacetate TH-2 (Hercules Powder Company):

Clear films with shrinkage of 0–2%, and flexible at 20° C. and below −50° C. by the addition of:

n-Hexyl diester of camphenic acid
n-Hexyl ester of dl-pinonic acid (solid pinonic acid from alpha pinene)
n-Hexyl monoester of camphoric acid
n-Hexyl ester of pinonic acid (liquid pinonic acid from alpha pinene)
Benzyl ester of pinonic acid
Ethoxyethyl ester of pinonic acid (c) The following results were obtained with Cellulose Propionate—Formula No. 28251 (Celanese Corp.).

Clear films with shrinkage of 0–2%, and flexible at 20° C. and below −50° C. by the addition of:

n-Hexyl monoester of camphoric acid
n-Hexyl diester of camphoric acid
n-Hexyl diester of camphenic acid
n-Hexyl ester of dl-pinonic acid (solid acid from alpha pinene)
n-Hexyl ester of pinonic acid (liquid pinonic acid from alpha pinene)

n-Hexyl ester of pinonic acid (liquid pinonic acid from crude sulfate turpentine)
Benzyl ester of pinonic acid (from crude sulfate turpentine)
Benzyl ester of pinonic acid (from alpha pinene)
Ethoxyethyl ester of pinonic acid
2-ethyl-hexanediol-1,3 ester of pinonic acid
Nopinic acid esterified with n-hexyl alcohol
n-Hexyl ester of camphenic acid
Liquid pinonic acid esterified with terpene alcohol obtained by oxidation of alpha pinene (not flexible at −50° C.)

(d) The following results were obtained with Polystyrene 5110–P8 (Koppers Co.):

Clear films with shrinkage of 0–2%, and flexible at 20° C. (the films were not flexible at −50° C.), by the addition of:

n-Hexyl monoester of camphoric acid
n-Hexyl diester of camphoric acid
n-Hexyl diester of camphenic acid
n-Hexyl ester of dl-pinonic acid (solid pinonic acid, from alpha pinene)
n-Hexyl ester of pinonic acid (liquid pinonic acid from alpha pinene)
n-Hexyl ester of pinonic acid (liquid pinonic acid from crude sulfate turpentine)
Cyclohexyl ester of pinonic acid (from crude sulfate turpentine)
Benzyl ester of pinonic acid (from alpha pinene)

(e) The following results were obtained with polyvinyl butyral:

Clear films with shrinkage of 0–2%, and flexible at 20° C. and below −50° C., by the addition of:

n-Hexyl monoester of camphoric acid
n-Hexyl diester of camphoric acid
n-Hexyl diester of camphenic acid
n-Hexyl ester of dl-pinonic acid (solid pinonic acid, from alpha pinene)
n-Hexyl ester of pinonic acid (liquid pinonic acid from alpha pinene)
n-Hexyl ester of pinonic acid (liquid pinonic acid from crude sulfate turpentine)
Cyclohexyl ester of pinonic acid (from crude sulfate turpentine)
Benzyl ester of pinonic acid (from alpha pinene)

In comparative tests to determine the effectiveness of a commercial plasticizer on cellulose esters at low temperatures it was found that Cellulose Acetate PM-3, Cellulose Triacetate TH-2, and Cellulose Propionate Formula Number 28,251, each plasticized with Santicizer E-15 (ethyl phthalyl glycollate) in the ratio of one part of plasticizer to 4 parts of cellulose ester yielded a film that was non-flexible at −50° C. The same results were obtained by the addition of Santicizer M-17 (methyl phthalyl ethyl glycollate) in the same proportions.

In a test for fungistatic properties of a film plasticized with terpene carboxylic acid ester, sterile and non-sterile cellulose films, plasticized with the n-hexyl ester of pinonic acid were inoculated with a Wellman, McCallan, spore suspension. The plasticized cellulose acetate films were not attacked by fungi after 14 days' incubation at 85 to 90% relative humidity.

In a comparative test for the fungistatic properties of terpene carboxylic acid esters, they were added to Czapek's agar solution (concentration of 250 p. p. m.); the solutions were placed on test plates, inoculated with *Aspergillus niger*, TC215–4247, and incubated for 96 hours at 85–90° F. and 85–90% relative humidity. The results were computed in terms of per cent of inhibition, based on the average diameter of the fungus colonies of the test plates as compared to that of the untreated controls. The results are shown in the following table:

TABLE 1

| Compound | Percent Inhibition |
|---|---|
| n-Hexyl ester of dl-pinonic acid (solid pinonic acid, from alpha pinene) | 51 |
| n-Hexyl ester of liquid pinonic acid (from alpha pinene) | 50 |
| Benzyl ester of pinonic acid | 54 |
| These results are superior to results obtained with conventional fungistatic agents: | |
| Benzoic acid | 42 |
| n-Hexyl benzoate | 48 |
| Salicylic acid | 40 |

While I do not desire to limit myself to any particular theory as to the reason for the plasticizing effectiveness of the esters of terpene carboxylic acids in accordance with the present invention, it may be that, particularly in the case of the higher esters of camphoric acid such as the n-hexyl diester of camphoric acid, a migration takes place in situ with the formation of the anhydride (e. g. d-camphoric anhydride which is an exceedingly effective plasticizer).

In addition to the usefulness of the terpene carboxylic acid esters, as disclosed herein, as plasticizers for cellulose esters and resins of the type obtained by the polymerization of a monomer containing a polymerizable $CH_2$:CH— group (such as for instance polystyrene or polyvinyl butyral), they can also serve as plasticizers for natural and synthetic rubbers, as pour point depressants for low temperature lubricants, brake fluids, and leather greases. Their desirable fungistatic properties can be utilized in adhesive compositions, as fixatives in soaps and lotions, as pigment carriers in paints, in protective coatings and lacquers, and other applications.

It will be understood that the various examples given herein are illustrative of specific instances of the production and utilization of terpene carboxylic acid esters in accordance with the present invention, and are not intended to limit the scope of my invention to the particular details set forth in such examples. Inasmuch as variations and modifications within the spirit of my invention will be readily apparent to the expert, I intend to encompass such variations and modifications within the scope of my appended claims.

I claim:

1. An ester of a monocyclic keto terpene carboxylic acid being a member of the group consisting of pinonic acid and pinoylformic acid, wherein the esterifying group is an ester-forming radical of a liquid alcohol of the type $A(OH)_n$, $n$ being an integer not less than 1 and not more than 2, and A being a member of the group consisting of an aliphatic hydrocarbon radical having at least 6 carbon atoms, an aliphatic ether radical having at least 4 carbon atoms, a cycloaliphatic hydrocarbon radical, and an aromatic hydrocarbon radical wherein the benzene ring is linked to the alcoholic hydroxyl group by a methylene group.

2. An ester of pinonic acid, wherein the esterifying group is an ester forming radical of a liquid alcohol of the type $A(OH)_n$, $n$ being an integer not less than 1 and not more than 2, and A being a member of the group consisting of an aliphatic hydrocarbon radical having at least 6 carbon atoms, an aliphatic ether radical having at least 4 carbon atoms, a cycloaliphatic hydrocarbon radical, and an aromatic hydrocarbon radical wherein the benzene ring is linked to the alcoholic hydroxyl group by a methylene group.

3. The n-hexyl ester of pinonic acid.

4. An ester of pinonic acid and of a liquid monohydric alcohol, said alcohol being characterized by a saturated hydrocarbon chain having 6 carbon atoms.

5. The ethoxyethyl ester of pinonic acid.

6. The ester of pinonic acid and 2-ethyl-hexanediol-1,3.

7. The benzyl ester of pinonic acid.

8. A method of preparing 2,2-dimethyl cyclobutane keto terpene carboxylic acid esters, comprising reacting crude sulfate turpentine which contains predominantly alpha-pinene contaminated by malodorous organic sulfur compounds, with an oxidizing agent which does not split the 2,2-dimethyl cyclobutane ring of said alpha-pinene, removing the solid reaction products, acidifying the liquid residue whereby a sulfur-contaminated 2,2-dimethyl cyclobutane keto terpene carboxylic acid layer is formed, separating said acid layer, esterifying the same, and desulfurizing the ester.

9. The method according to claim 8, wherein said oxidizing agent is an alkali metal permanganate.

10. A method of preparing 2,2-dimethyl cyclobutane keto terpene carboxylic acids, comprising reacting crude sulfate turpentine which contains predominantly alpha-pinene contaminated by malodorous organic sulfur compounds, with an oxidizing agent which does not split the 2,2-dimethyl cyclobutane ring of said alpha-pinene, removing the solid reaction products, acidifying the liquid residue whereby a sulfur-contaminated 2,2-dimethyl cyclobutane keto terpene carboxylic acid layer is formed, and desulfurizing said 2,2-dimethyl cyclobutane keto terpene carboxylic acid.

11. A continuous process of preparing pinonic acid, comprising reacting crude sulfate turpentine which contains predominantly alpha-pinene contaminated by malodorous organic sulfur compounds, with an oxidizing agent which does not split the 2,2-dimethyl cyclobutane ring of said alpha-pinene, removing the solid reaction products, acidifying the liquid residue, continuously extracting the acidified liquid in countercurrent with a water-immiscible organic solvent, continously separating said solvent, and fractionating the sulfur-contaminated residue into a sulfur-containing forerun and at least one main fraction principally containing solid and liquid pinonic acids.

12. A continuous process of preparing pinonic acid, comprising reacting crude sulfate turpentine which contains predominantly alpha-pinene contaminated by malodorous organic sulfur compounds, with potassium permanganate in the presence of ammonium sulfate, removing the solid reaction products, acidifying the sulfur contaminated liquid residue to a pH of about 5.5, extracting and purifying acidified liquid in countercurrent with chloroform, continuously removing said chloroform, purifying said chloroform and returning the purified chloroform to the process.

13. A method of preparing pinonic acid, comprising reacting crude sulfate turpentine which contains predominantly alpha-pinene contaminated by malodorous organic sulfur compounds, with an oxidizing agent which does not split the 2,2-dimethyl cyclobutane ring of said alpha-pinene, removing the solid reaction products, acidifying the liquid residue, extracting the acidified liquid with a water-immiscible organic solvent, separating said solvent, and fractionating the sulfur-contaminated residue into a sulfur containing fore-run and into at least one main fraction principally containing pinonic acid.

14. A method of preparing a 2,2-dimethyl cyclobutane keto terpene carboxylic acid ester, comprising esterifying a 2,2-dimethyl cyclobutane keto terpene carboxylic acid obtained from crude sulfate turpentine by the method of claim 10, said acids being characterized by a positive sulfur test.

15. A method of preparing a terpenyl ester of pinonic acid, comprising reacting turpentine which contains predominantly alpha-pinene contaminated by malodorous organic sulfur compounds, with an oxidizing agent which does not split the 2,2-dimethyl cyclobutane ring of said alpha-pinene, removing the solid reaction product whereby a liquid residue principally containing terpenyl alcohols is obtained, dividing said liquid residue into two portions, acidifying one of said portions, extracting said acidified portion with a water-immiscible organic solvent and removing said solvent whereby pinonic acid is obtained, and esterifying the pinonic acid thus formed by reacting it with the other portion of said liquid residue.

16. An ester of pinonic acid, wherein the esterifying group is the radical of a cycloaliphatic terpenyl alcohol obtained by the oxidation of pinene.

17. An alkoxyethyl ester of pinonic acid, wherein the alkoxyethyl radical has at least 4 carbon atoms.

References Cited in the file of this patent

UNITED STATES PATENTS

| Number | Name | Date |
|---|---|---|
| 577,302 | Hesse | Feb. 16, 1897 |
| 707,278 | Summers | Aug. 19, 1902 |
| 2,062,144 | Barrett et al. | Dec. 8, 1936 |
| 2,333,718 | Heisel | Nov. 9, 1943 |
| 2,360,898 | Sarbach | Oct. 24, 1944 |
| 2,394,952 | Vincent | Feb. 12, 1946 |
| 2,396,264 | Huffman | Mar. 12, 1946 |
| 2,407,937 | Rummelsberg | Sept. 17, 1946 |
| 2,427,344 | Bain | Sept. 16, 1947 |

OTHER REFERENCES

Beilstein, Vierte Auflage, vol. 9, pages 752, 753, 744 and 745.

Beilstein, vol. 10, pages 622–625 and 32.

Beilstein, Vierte Auflage, 1st supplemental, vol. 9, pages 322 and 323.

Cohen: J. Chem. Soc. 109, 222–235 (1916).

Beilstein, 4th ed. (1927), page 617.

Schoene: Arch. Exptl. Path., Pharmacol. 190, 372-5 (1938).